Patented June 6, 1944

2,350,548

UNITED STATES PATENT OFFICE 2,350,548

ASPHALTIC EMULSION

William W. De Laney, Marshallton, Del., assignor to Hercules Powder Company, Wilmington, Del., a corporation of Delaware No Drawing. Application October 25, 1940, Serial No. 362,806

7 Claims. (Cl. 252—311.5)

This invention relates to asphaltic emulsions and the like, and more particularly to intermediate breaking bituminous or asphaltic emulsions, and to a method of controlling the demulsibility of the emulsion.

The satisfactory use of aqueous asphaltic emulsions requires that they have the desired breaking characteristics. Certain emulsifying agents or emulsifiers including rosin soaps and fatty acid soaps produce quick breaking emulsions. Other materials produce slow breaking emulsions. In many cases the emulsions used must meet specifications which require an intermediate breaking rate. In the past, it has been a common practice to obtain intermediate breaking emulsions by first producing a quick breaking emulsion, and then treating it with a stabilizer, such as casein, to obtain the desired breaking rate. Most stabilizing agents have disadvantages including high cost, danger of putrification, or that they are detrimental to the other properties of the emulsion.

An object of the invention is to provide an improved intermediate breaking bituminous or asphaltic emulsion.

Another object is to provide an intermediate breaking emulsion having an emulsifier therein adapted to give the emulsion a predetermined breaking rate.

Another object of the invention is to provide an emulsifier for intermediate breaking asphaltic emulsions which can be economically prepared.

Another object is to provide intermediate breaking emulsions without relying upon stabilizing agents, whereby the emulsion is not subject to the disadvantages resulting from the use of stabilizing agents.

A further object is to provide a method of accurately controlling the rate of demulsibility of intermediate breaking asphaltic emulsions over a relatively wide range.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, it has been found that intermediate breaking emulsions can be produced from blends of emulsifying agents which produce quick and slow breaking emulsions, respectively. Such blends provide more suitable intermediate breaking emulsions than those prepared by stabilizing a quick breaking emulsion. As an emulsifier or emulsifying agent which produces a slow breaking emulsion, saponified substantially petroleum-hydrocarbon-insoluble pine wood resin may be used, and as an emulsifier or emulsifying agent for producing a quick breaking emulsion, soaps of materials other than such resin, containing soap-forming acids such as rosin acids and/or fatty acids, may be used. When certain slow breaking soaps are selected and the blending ratio of the quick and slow breaking emulsifying agents is accurately controlled, it has been found that intermediate breaking emulsions having a predetermined rate of demulsibility can be provided. It has also been found that the rate of demulsibility of such emulsions can be duplicated whenever desired.

The material which is characterized by the term "substantially petroleum-hydrocarbon insoluble pine wood resin," herein and in the appended claims, is the resinous material which may be prepared from pine wood, preferably from stump pine wood, in the following manner: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum hydrocarbon such as, for example, gasoline, dissolves and removes the rosin. After separation of the rosin, high in abietic acid, a resinous residue remains which is low in abietic acid. Alternatively, the residue of the initial coal tar hydrocarbon extract may be dissolved in gasoline and treated with furfural, and the two layers which form separated. The resinous residue is found dissolved in the furfural from which it may be obtained by evaporation of the furfural. This resinous residue, used in the composition of the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol insoluble material, depending upon the details of the extraction processes utilized. The resinous residue may be defoamed by steaming or heat treating to get rid of volatile substances.

Another method of producing this resin comprises treating the benzol extracted wood rosin with a mixture of gasoline and furfural which effectively dissolves the rosin in the gasoline and the resin in the furfural. The mixture is then permitted to stand and settle until two layers are formed which are separated. The furfural layer is then run through a still to remove the furfural and the resin is recovered.

This resin will meet or nearly meet the following specifications; substantial insolubility in petroleum hydrocarbons, substantially complete solubility in alcohol, a methoxy content from about 3% to about 7.5% (usually from about 4% to about 6%) an acid number in the range from about 80 to about 110, and a drop melting point in the range from about 95° C. to about 125° C.

The materials containing the soap-forming acid may be rosin, fatty acids, oils or the like. As a source of rosin acid, gum or wood rosin may be used which contain principally abietic acid and some pimaric acid. Other substances, such as tall oil, which contains rosin acids may be used. As a source of fatty acid, oleic, palmitic, or stearic acids may be used. Also the following substances, containing essentially soap-forming acids, may be used: castor oil, coconut oil, corn oil, cottonseed oil, cottonseed stearin, croton oil, flaxseed oil, linseed oil; fish oils such as menhaden oil, olive oil, palm oil, peanut oil, soya oil, sunflower oil, and tung oil; and other fatty vegetable or animal oils and fats which are of the type which are readily saponified and are commercially available. Also naphthenic acids recovered from petroleum may be saponified and used.

Preferably, as an emulsifying agent for producing a quick breaking emulsion, saponified rosin, for example, K wood rosin soap, saponified tall oil, saponified fish oil, saponified oleic acid, or saponified soya oil are used. These materials when blended in predetermined ratios with the saponified resin form an emulsifier adapted to produce various predetermined rates of demulsibility. It has been established that by blending the saponified resin with saponified materials containing rosin acids, fatty acids, or the like, the resulting emulsifier, when added to asphaltic emulsion, produces rates of demulsibility between 6 and 60%. The rate of demulsibility mentioned, herein and in the claims, is in accordance with the .1 N CaCl₂ test, which is described in American Society for Testing Materials, D244-36T.

More specifically, by way of example, it has been found that saponified substantially petroleum hydrocarbon-insoluble pine wood resin and saponified K wood rosin, saponified fish oil, saponified soya oil, saponified tall oil, or saponified oleic acid may be blended in the following proportions stated in parts by weight, to provide emulsifiers which give asphaltic or bituminous emulsions a desired breaking rate between 5 and 60%. It will be understood, however, that the proportions of materials may be varied slightly depending on the type and quantity of asphalt and the amount of water and emulsifier used in preparing the emulsion.

|  | I | II | III | IV | V |
|---|---|---|---|---|---|
| Saponified resin [1] | 45-55 | 80-85 | 75-80 | 75-85 | 75-85 |
| Saponified K wood rosin | 55-45 | | | | |
| Saponified fish oil | | 20-15 | | | |
| Saponified soya oil | | | 25-20 | | |
| Saponified tall oil | | | | 25-15 | |
| Sodium oleate | | | | | 25-15 |

[1] Substantially petroleum hydrocarbon insoluble pine wood resin.

The above mixed emulsifying agents may be prepared by blending the separate soaps in the desired proportions, or the resin may be mixed with the other saponifiable material in suitable proportions and the mixture then saponified, for example, by reacting with cold or hot aqueous sodium hydroxide.

The emulsions mentioned herein may be prepared from any suitable asphaltic or bituminous materials such as are usually used for surfacing roads or the like. For example, 600 parts by weight of California asphalt having a penetration of 150-200, may be emulsified in 400 parts by weight of water with the aid of about 2% of the mixed emulsifying agent, based on the total weight of the emulsion. The procedure employed in preparing asphalt emulsions may comprise adding the emulsifying agent to the water phase and thereafter adding the asphalt at a temperature of approximately 220° F. and in a fine stream to the water phase, which may be at approximately 125° F., with rapid stirring. The mixture is then passed through a suitable dispersing machine.

By selecting an emulsifying agent of a given composition of materials described in the foregoing examples, the emulsion may be provided with predetermined breaking characteristics and rate of demulsibility. For example, asphaltic emulsions having a predetermined breaking rate may have the following compositions:

|  | I | II | III | IV | V |
|---|---|---|---|---|---|
| Asphalt parts by weight | 600 | 600 | 600 | 600 | 600 |
| Water do | 400 | 400 | 400 | 400 | 400 |
| Saponified resin [1] do | 10 | 16 | 16 | 16 | 16 |
| Saponified K wood rosin do | 10 | | | | |
| Saponified tall oil do | | 4 | | | |
| Saponified fish oil do | | | 4 | | |
| Sodium oleate do | | | | 4 | |
| Saponified soya oil do | | | | | 4 |
| Demulsibility [2] per cent | 58 | 52 | 18 | 18 | 8 |

[1] Substantially petroleum hydrocarbon insoluble pine wood resin.
[2] .1 N CaCl₂ Test.

From the foregoing description and examples it will be seen that the present invention provides improved emulsifying agents for preparing asphaltic or bituminous aqueous emulsions having intermediate breaking rates. The breaking rate can be varied between about 5% and 60% by selecting compositions of the saponified resin and a saponified material other than said resin. These breaking rates can be accurately predetermined and can be duplicated whenever desired. The emulsifying agents can be readily prepared, in a convenient and economical manner, and are not subject to putrification. Only relatively small amounts of the agents are required to emulsify the asphalt and water mixture to provide a stable emulsion which has the advantageous characteristics referred to herein.

Other modes of applying the principle of my invention may be employed instead of those explained, change being made as regards the methods or compositions herein disclosed, provided the method or the ingredients stated by any of the following claims, or the equivalent of such stated methods or ingredients, be employed.

What I claim and desire to protect by Letters Patent is:

1. An emulsifier for producing intermediate breaking aqueous asphaltic emulsions comprising from about 50 to about 80% by weight of an alkali metal soap of substantially petroleum hydrocarbon-insoluble pine wood resin, and from about 50 to about 20% by weight of an alkali metal soap of a material having a saponifiable acid constituent in the group consisting of resin acid, fatty acid, and resin and fatty acids, said material selected from the group consisting of rosin, animal oils, vegetable oils, and tall oil.

2. An emulsifier for producing intermediate breaking aqueous asphaltic emulsions comprising from about 50 to about 80% by weight of an alkali metal soap of substantially petroleum hydrocarbon-insoluble pine wood resin and from about 50 to about 20% by weight of an alkali metal soap of rosin.

3. An emulsifier for producing intermediate breaking aqueous asphaltic emulsions comprising from about 50 to about 80% by weight of an alkali metal soap of substantially petroleum hydrocarbon-insoluble pine wood resin and from about 50 to about 20% by weight of an alkali metal soap of fish oil.

4. An emulsifier for producing intermediate breaking aqueous asphaltic emulsions comprising from about 50 to about 80% by weight of an alkali metal soap of substantially petroleum hydrocarbon-insoluble pine wood resin and from about 50 to about 20% by weight of an alkali metal soap of soya oil.

5. An emulsifier for producing intermediate breaking aqueous asphaltic emulsions comprising from about 50 to about 80% by weight of an alkali metal soap of substantially petroleum hydrocarbon-insoluble pine wood resin and from about 50 to about 20% by weight of an alkali metal soap of an animal oil.

6. An emulsifier for producing intermediate breaking aqueous asphaltic emulsions comprising from about 50 to about 80% by weight of an alkali metal soap of substantially petroleum hydrocarbon-insoluble pine wood resin and from about 50 to about 20% by weight of an alkali metal soap of a vegetable oil.

7. An emulsifier for producing intermediate breaking aqueous asphaltic emulsions comprising from about 50 to about 80% by weight of an alkali metal soap of substantially petroleum hydrocarbon-insoluble pine wood resin and from about 50 to about 20% by weight of an alkali metal soap of oleic acid.

WILLIAM W. DE LANEY.